(12) United States Patent
Nakagawa

(10) Patent No.: US 12,123,454 B2
(45) Date of Patent: Oct. 22, 2024

(54) JOINT STRUCTURE

(71) Applicant: FANUC CORPORATION, Yamanashi (JP)

(72) Inventor: Yuuya Nakagawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 200 days.

(21) Appl. No.: 17/909,378

(22) PCT Filed: Mar. 4, 2021

(86) PCT No.: PCT/JP2021/008415
§ 371 (c)(1),
(2) Date: Sep. 4, 2022

(87) PCT Pub. No.: WO2021/177401
PCT Pub. Date: Sep. 10, 2021

(65) Prior Publication Data
US 2023/0089632 A1 Mar. 23, 2023

(30) Foreign Application Priority Data
Mar. 6, 2020 (JP) .................................. 2020-038300

(51) Int. Cl.
*F16B 5/02* (2006.01)
(52) U.S. Cl.
CPC ....................................... *F16B 5/02* (2013.01)
(58) Field of Classification Search
CPC ..................................... F16B 5/02; F16B 3/00
See application file for complete search history.

(56) References Cited

U.S. PATENT DOCUMENTS 4,448,565 A  5/1984  Peterson

FOREIGN PATENT DOCUMENTS

CN  202425255 U  9/2012
CN  107816476 A  3/2018
(Continued)

OTHER PUBLICATIONS

English translation JP201623659 Okayama (Year: 2016).*
(Continued)

*Primary Examiner* — Jason L Vaughan
*Assistant Examiner* — Amanda Kreiling
(74) *Attorney, Agent, or Firm* — Robert P. Michal, Esq.; Carter, DeLuca & Farrell LLP

(57) ABSTRACT

Provided is a joint structure which is capable of easily preventing relative positional shifting between two members joined by a screw member, and which has favorable workability. The joint structure joins a first member that is provided with a screw hole in which female screw threading is formed and a second member that can be stacked on the first member, by insertion from the second member side of a screw member that has formed thereon male screw threading which screws into the female screw threading. The joint structure is provided with a protruding part that is provided to the first member and that has formed therein a first through hole that guides the screw member into the screw hole. The second member has a width that is smaller than the width of the protruding part, and has formed therein a second through hole which guides the screw member into the screw hole via the first through hole, and a recessed part which accommodates the protruding part.

4 Claims, 7 Drawing Sheets

(56) References Cited

FOREIGN PATENT DOCUMENTS

| | | |
|---|---|---|
| JP | 57154685 A | 9/1924 |
| JP | S6149619 U | 4/1986 |
| JP | 02044106 U | 3/1990 |
| JP | 04099133 U | 8/1992 |
| JP | 06084520 U | 12/1994 |
| JP | H10340559 A | 12/1998 |
| JP | 2002206579 A | 7/2002 |
| JP | 2016023659 A | 2/2016 |
| TW | 201606207 A | 2/2016 |
| WO | 02097287 A1 | 12/2002 |

OTHER PUBLICATIONS

English translation S63-122165 Hino Motors (Year: 1990).*
International Search Report issued by the Japanese Patent Office acting as the International Searching Authority in relation to International Application No. PCT/JP2021/008415 dated May 18, 2021 (4 pages) along with English language translation (3 pages).
Written Opinion of the International Searching Authority issued by the Japanese Patent Office acting as the International Searching Authority in relation to International Application No. PCT/JP2021/008415 dated May 18, 2021 (5 pages).
Chinese Office Action dated May 10, 2024, issued in corresponding Chinese Application No. 202180018675, 7 pages and English translation 5 pages, total 12 pages.

* cited by examiner

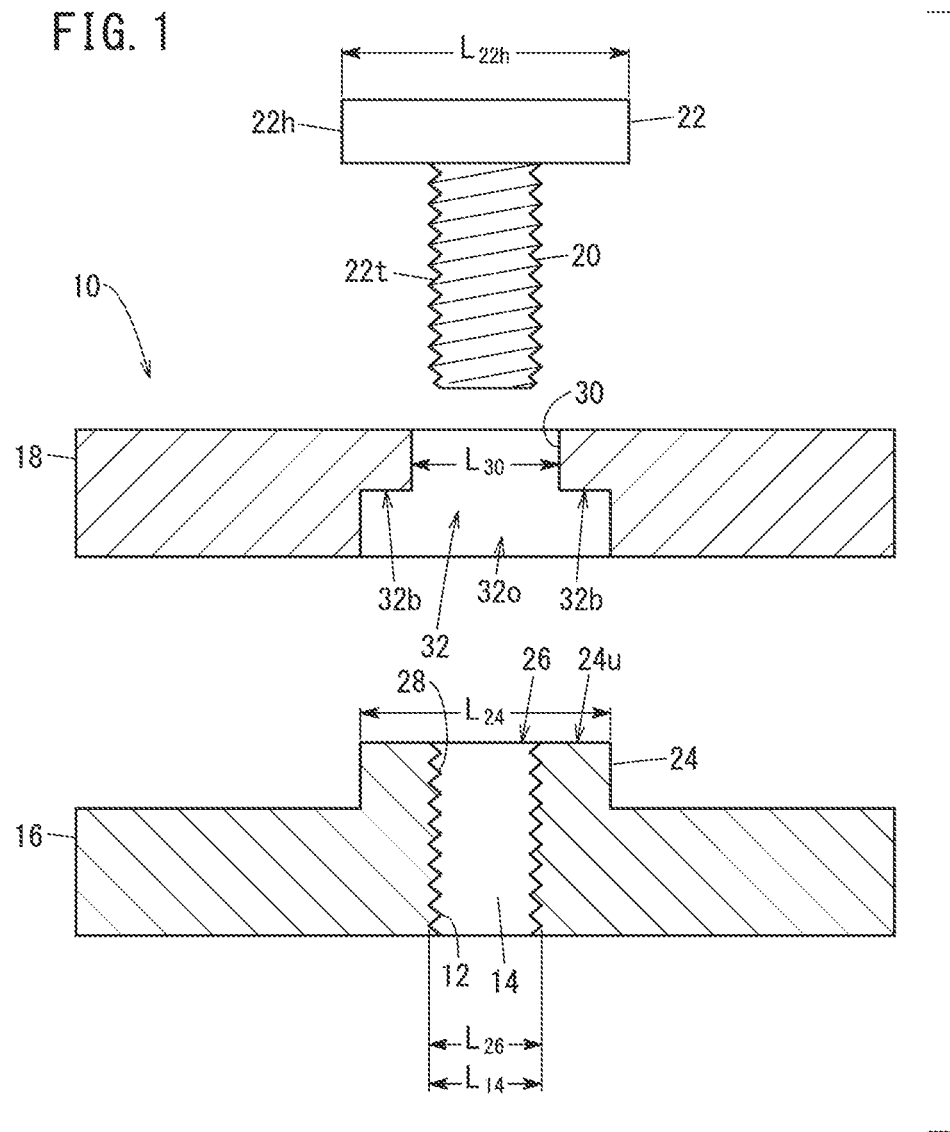

JOINT STRUCTURE

CROSS-REFERENCE TO RELATED APPLICATIONS

This application is a national phase entry under 35 U.S.C. 371 of PCT International Application No. PCT/JP2021/008415, filed Mar. 4, 2021, which claims priority to Japanese Patent Application No. 2020-038300, filed Mar. 6, 2020, the disclosure of each of these applications is expressly incorporated herein by reference in their entirety.

TECHNICAL FIELD

The present invention relates to a coupling structure. In particular, the present invention relates to a coupling structure (joint structure) for fastening together a first member provided with a screw hole including a female thread, and a second member stacked on the first member, by inserting, from the second member side, a screw member including a male thread screwed into the female thread.

BACKGROUND ART

In the manufacture of industrial products, a structure for coupling two superimposed members by a screw member is well known. This is disclosed, for example, in JP S61-049619 U.

SUMMARY OF THE INVENTION

Two members to be coupled are provided with insertion holes for inserting a screw member. Here, in the conventional coupling structure, for example, in the conventional coupling structure disclosed in JP S61-049619 U, it is necessary to fix the two members so that the relative positions thereof are not displaced until the two members are coupled.

The present invention has been made in view of the above. That is, an object of the present invention is to provide a coupling structure that is capable of easily suppressing the relative positional displacement between two members coupled by a screw member, and that has favorable workability.

According to an aspect of the present invention, there is provided a coupling structure that fastens together a first member provided with a screw hole including a female thread, and a second member stacked on the first member, by inserting, from a side of the second member, a screw member including a male thread configured to be screwed into the female thread, the coupling structure comprising a convex portion provided in the first member and including a first through-hole configured to guide the screw member to the screw hole, wherein the second member includes a second through-hole having a width smaller than a width of the convex portion and configured to guide the screw member to the screw hole via the first through-hole, and a concave portion configured to accommodate the convex portion.

According to the aspect of the present invention, there is provided a coupling structure that is capable of easily suppressing the relative positional displacement between two members coupled by a screw member, and that has favorable workability.

BRIEF DESCRIPTION OF DRAWINGS

FIG. 1 is a cross-sectional view for explaining a coupling structure according to an embodiment of the present invention;

DESCRIPTION OF THE INVENTION

Figure 2A:
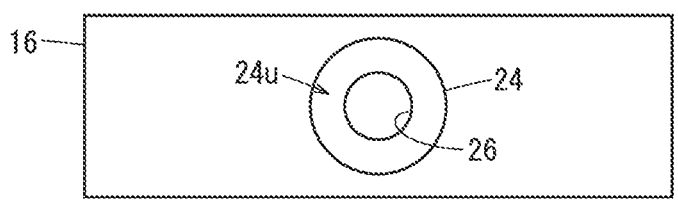
FIG. 2A is a plan view of a first example of a first member.

A preferred embodiment of a coupling structure according to the present invention will be described in detail below with reference to the accompanying drawings.

Embodiment

FIG. 1 is a cross-sectional view for explaining a coupling structure 10 according to an embodiment of the present invention.

The coupling structure 10 is a structure for fastening together a first member 16 provided with a screw hole 14 including a female thread 12 and a second member 18 stacked on the first member 16, by inserting, from the second member 18 side, a screw member 22 including a male thread 20 screwed into the female thread 12. Each of the first member 16 and the second member 18 is, for example but not limited to, a sheet metal member such as a short bar.

The coupling structure 10 includes a convex portion 24 provided in the first member 16 so as to cover the screw hole 14. A first through-hole 26 communicating with the screw hole 14 is formed in the convex portion 24. Specifically, the coupling structure 10 of the present embodiment includes the convex portion 24 which is provided in the first member 16 and in which the first through-hole 26 for guiding the screw member 22 to the screw hole 14 is formed.

In the present embodiment, the convex portion 24 is a projecting portion (raised portion) of the first member 16 formed by partially increasing the thickness of the first member 16. The configuration of the convex portion 24 is not limited thereto. For example, the convex portion 24 may be a burr or a driving nut formed on the first member 16.

Figure 2B:
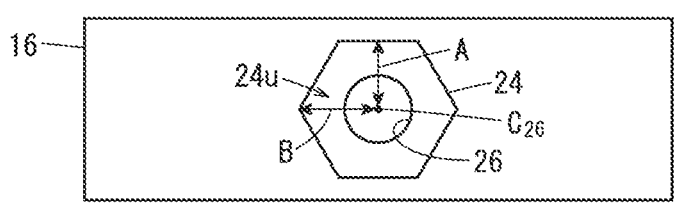
FIG. 2B is a plan view of a second example of the first member.
Figure 2C:
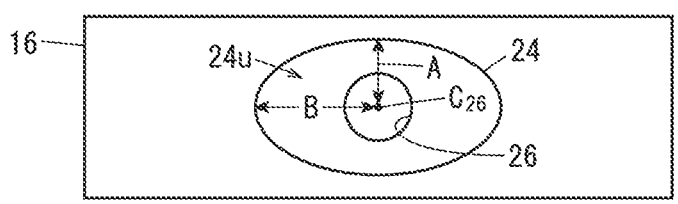
FIG. 2C is a plan view of a third example of the first member.
Figure 2D:
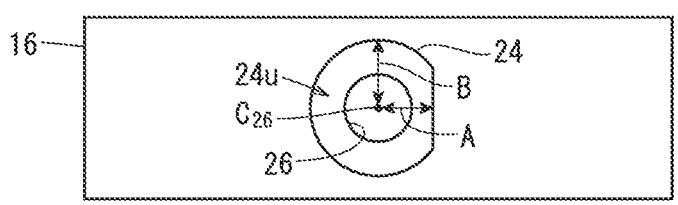
FIG. 2D is a plan view of a fourth example of the first member.
Figure 2E:
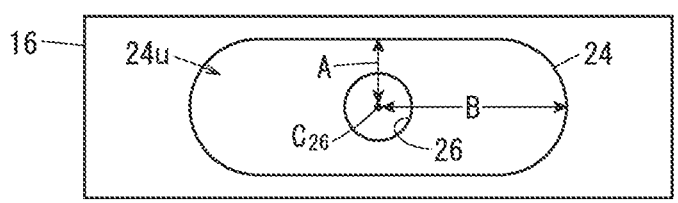
FIG. 2E is a plan view of a fifth example of the first member.

FIG. 2A is a plan view of a first example of the first member 16. FIG. 2B is a plan view of a second example of the first member 16. FIG. 2C is a plan view of a third example of the first member 16. FIG. 2D is a plan view of a fourth example of the first member 16. FIG. 2E is a plan view of a fifth example of the first member 16.

An upper surface 24u of the convex portion 24 has, for example, a circular shape in a plan view (viewed in the width direction) as illustrated in FIG. 2A. However, the shape of the upper surface 24u of the convex portion 24 is not limited thereto. For example, as illustrated in FIGS. 2B to 2E, the shape of the upper surface 24u may be a shape (non-circular shape) having a plurality of different lengths from a center $C_{26}$ of the first through-hole 26 to the outer edge of the upper surface 24u in a plan view. It should be noted that, concerning the shape of the upper surface 24u, a regular hexagonal (polygonal) shape is illustrated in FIG. 2B, an elliptical shape is illustrated in FIG. 2C, a partial circular shape is illustrated in FIG. 2D, and an elongated hole shape is illustrated in FIG. 2E. FIGS. 2B to 2E illustrate the case in which the upper surface 24u has a short side length A and a long side length B. However, the upper surface 24u may have three or more different lengths from the center $C_{26}$ to the outer edge of the upper surface 24u in a plan view.

In particular, each of the configurations of FIGS. 2B to 2E is preferable when it is desired to suppress rotation of the first member 16 relative to the second member 18. The reason will be described later.

In the present embodiment, as an example, the convex portion 24 has a regular hexagonal shape (FIG. 2B).

Returning to FIG. 1, the first through-hole 26 formed in the convex portion 24 has a width (radius) $L_{26}$ equal to or larger than a width (radius) $L_{14}$ of the screw hole 14 ($L_{26} \geq L_{14}$). Preferably, the width $L_{26}$ is as close as possible to the width $L_{14}$. By making the width $L_{26}$ close to the width $L_{14}$, the screw member 22 can be more accurately guided to the screw hole 14 by the first through-hole 26.

In the present embodiment, it is assumed that the width $L_{26}$ and the width $L_{14}$ are equal to each other ($L_{26}=L_{14}$), and the first through-hole 26 is provided with a screw groove 28 that is screwed with the male thread 20 when the screw member 22 is inserted and that is formed continuously with the female thread 12. Note that the screw groove 28 may be omitted from the configuration of the coupling structure 10 when the width $L_{26}$ is larger than the width $L_{14}$ ($L_{26}>L_{14}$).

The second member 18 includes: a second through-hole 30 for guiding the screw member 22 to the first through-hole 26 in a state in which the first member 16 and the second member 18 are superimposed; and a concave portion 32 for accommodating the convex portion 24. Among them, the second through-hole 30 has a width (radius) $L_{30}$ smaller than a shortest width $L_{24}$ of the convex portion 24 and larger than the width (radius) $L_{26}$ of the first through-hole 26 in the extending direction of the upper surface 24u ($L_{24}>L_{30}>L_{26}$).

The width $L_{30}$ may be appropriately changed in design as long as it is within this range ($L_{24}>L_{30}>L_{26}$). That is, as the $L_{30}$ is larger, the screw member 22 can be more easily inserted into the second through-hole 30, whereby workability is improved. Further, as the $L_{30}$ is smaller, the screw member 22 can be more accurately guided to the first through-hole 26 by the second member 18, whereby workability is improved.

In the present embodiment, the concave portion 32 is a depressed portion (depression) of the second member 18 formed by partially reducing the thickness of the second member 18. The concave portion 32 accommodates the convex portion 24 and is preferably fitted to the convex portion 24. When the upper surface 24u of the convex portion 24 has a non-circular shape in a plan view, it is preferable that the concave portion 32 also has a non-circular shape. The reason will be described later. In the present embodiment, it is assumed that the concave portion 32 has a regular hexagonal shape in a plan view, and has a short side length A' and a long side length B' which are the lengths from the center of the second through-hole 30 to the outer edge of the concave portion 32 and are different from each other (FIG. 3B).

The screw member 22 coupling the first member 16 and the second member 18 includes a shank part 22t and a head part 22h. The above-described male thread 20 is formed on the shank part 22t. The head part 22h of the present embodiment has a width $L_{22h}$ larger than the width $L_{30}$ of the second through-hole 30 ($L_{22h}>L_{30}$). As a result, when the screw member 22 is inserted into the second through-hole 30, the head part 22h is prevented from entering the second through-hole 30. However, it is not essential in the present embodiment that the width $L_{22h}$ is larger than the width $L_{30}$. For example, a washer having a width larger than the width $L_{30}$ may be provided between the head part 22h and the second through-hole 30. As a result, even when the width $L_{22h}$ is smaller than the width $L_{30}$, the head part 22h is prevented from entering the second through-hole 30 by the washer.

Figure 3A:
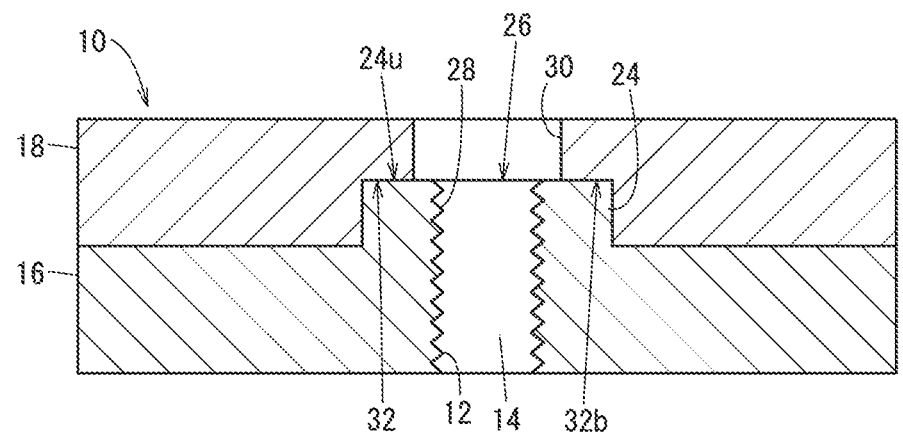
FIG. 3A is a first view illustrating a state in which the first member and a second member are superimposed with each other.
Figure 3B:
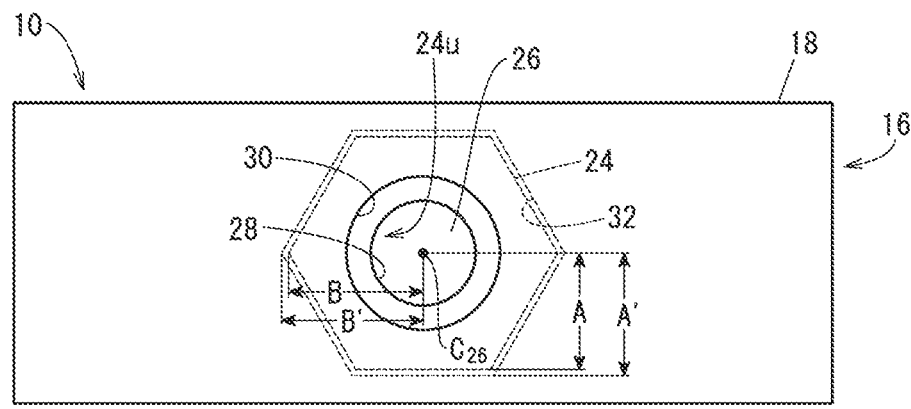
FIG. 3B is a second view illustrating a state in which the first member and the second member are superimposed with each other.

FIG. 3A is a first view illustrating a state in which the first member 16 and the second member 18 are superimposed with each other.

When the first member 16 and the second member 18 are coupled by the screw member 22, first, the first member 16 and the second member 18 are superimposed with each other such that the upper surface 24u of the convex portion 24 and a bottom portion 32b of the concave portion 32 face each other. As a result, the convex portion 24 is accommodated in the concave portion 32, and at the same time, alignment between the second through-hole 30 and the screw hole 14 is achieved. At this time, when the convex portion 24 and the concave portion 32 are fitted to each other, the alignment between the second through-hole 30 and the screw hole 14 is more favorably achieved.

FIG. 3B is a second view illustrating a state in which the first member 16 and the second member 18 are superimposed with each other. In FIG. 3B, the center of the second through-hole 30 coincides with the center $C_{26}$ of the first through-hole 26.

In the present embodiment, if the length A' is less than the length B, it is possible to prevent the first member 16 from rotating relative to the second member 18 in a state in which the convex portion 24 is accommodated in the concave portion 32. That is, when the convex portion 24 and the concave portion 32 are about to rotate relative to each other, the rotational movement of a portion of the convex portion 24 that extends from the center $C_{26}$ by the long side length B can be prevented by a portion of the concave portion 32 that extends from the center $C_{26}$ by the length A' (FIG. 3B). When the convex portion 24 and the concave portion 32 are fitted to each other, the above-described rotation can be more favorably prevented.

In addition, in the present embodiment, the convex portion 24 formed by partially increasing the thickness of the first member 16 is accommodated in the concave portion 32 formed by partially reducing the thickness of the second member 18. With this configuration, the convex portion 24 and the concave portion 32 can be made inconspicuous after the first member 16 and the second member 18 are superimposed with each other, and the appearance of the coupling structure 10 can therefore be made compact.

Figure 4:
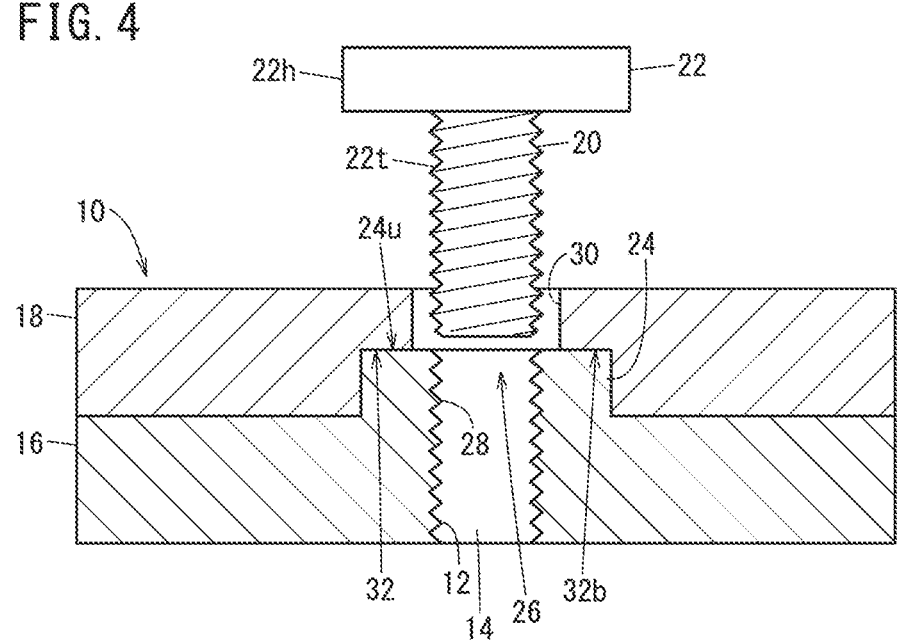
FIG. 4 is a view illustrating a state in which a screw member is inserted into a second through-hole.

FIG. 4 is a view illustrating a state in which the screw member 22 is inserted into the second through-hole 30.

After the first member 16 and the second member 18 are superimposed with each other, the shank part 22t of the screw member 22 is inserted into the second through-hole 30 and made to reach the first through-hole 26 along the second through-hole 30. At this time, since the width $L_{30}$ of the second through-hole 30 is less than the width $L_{24}$ of the upper surface 24u (FIG. 1), it is easier to accurately guide the screw member 22 to the first through-hole 26 than in the case where the width $L_{30}$ is greater than or equal to the width $L_{24}$.

Figure 5:
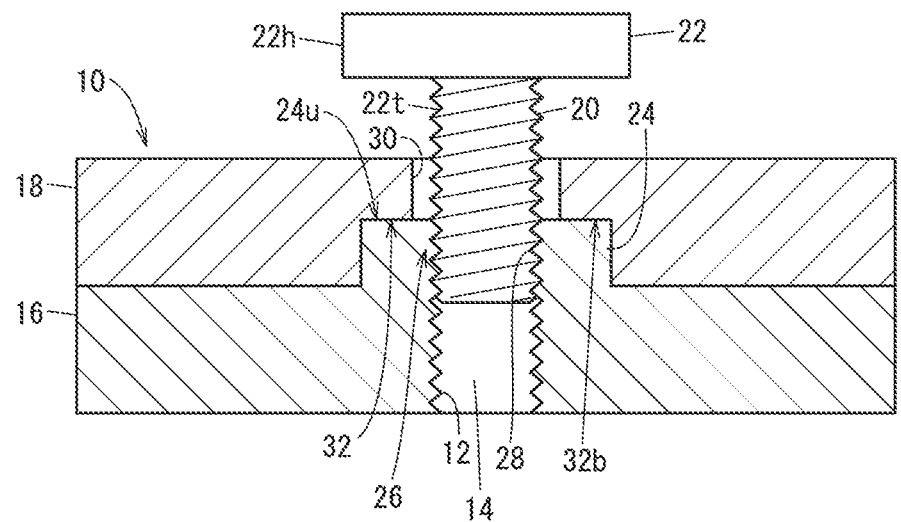
FIG. 5 is a view illustrating a state in which the screw member is inserted into a first through-hole.

FIG. 5 is a view illustrating a state in which the screw member 22 is inserted into the first through-hole 26.

After the screw member 22 reaches the first through-hole 26, the screw member 22 is inserted into the first through-hole 26 to reach the screw hole 14. At this time, by screwing the male thread 20 of the screw member 22 into the screw groove 28 of the first through-hole 26, the screw member 22 can be easily guided to the screw hole 14.

Figure 6:
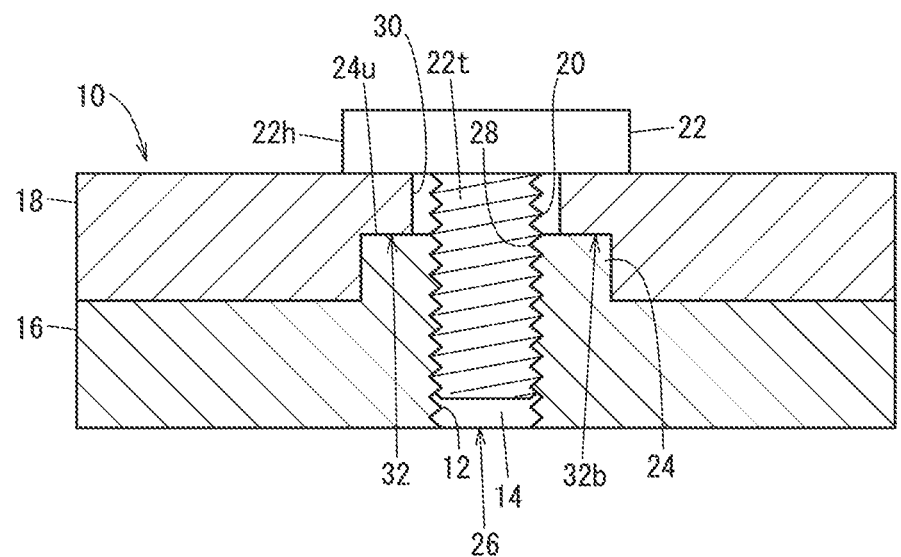
FIG. 6 is a view illustrating a state in which the first member and the second member are coupled by the screw member.

FIG. 6 is a view illustrating a state in which the first member 16 and the second member 18 are coupled by the screw member 22.

After the screw member 22 reaches the screw hole 14, the screw member 22 is inserted into the screw hole 14 while screwing the male thread 20 into the female thread 12. As a result, the first member 16 and the second member 18 are coupled by the screw member 22. At this time, since the screw groove 28 of the first through-hole 26 is formed continuously with the female thread 12 of the screw hole 14, the female thread 12 of the screw hole 14 and the male thread 20 of the screw member 22 can be smoothly screwed together.

As described above, according to the present embodiment, the coupling structure 10 is provided that is capable of easily suppressing the relative positional displacement between the two members (the first member 16 and the second member 18) coupled by the screw member 22, and that has favorable workability.

Modification

The embodiment has been described above as one example of the present invention. Various modifications or improvements are capable of being added to the above-described embodiment. Further, it is clear from the scope of the claims that other modes to which such modifications or improvements have been added can be included within the technical scope of the present invention.
(Modification 1)

Figure 7:
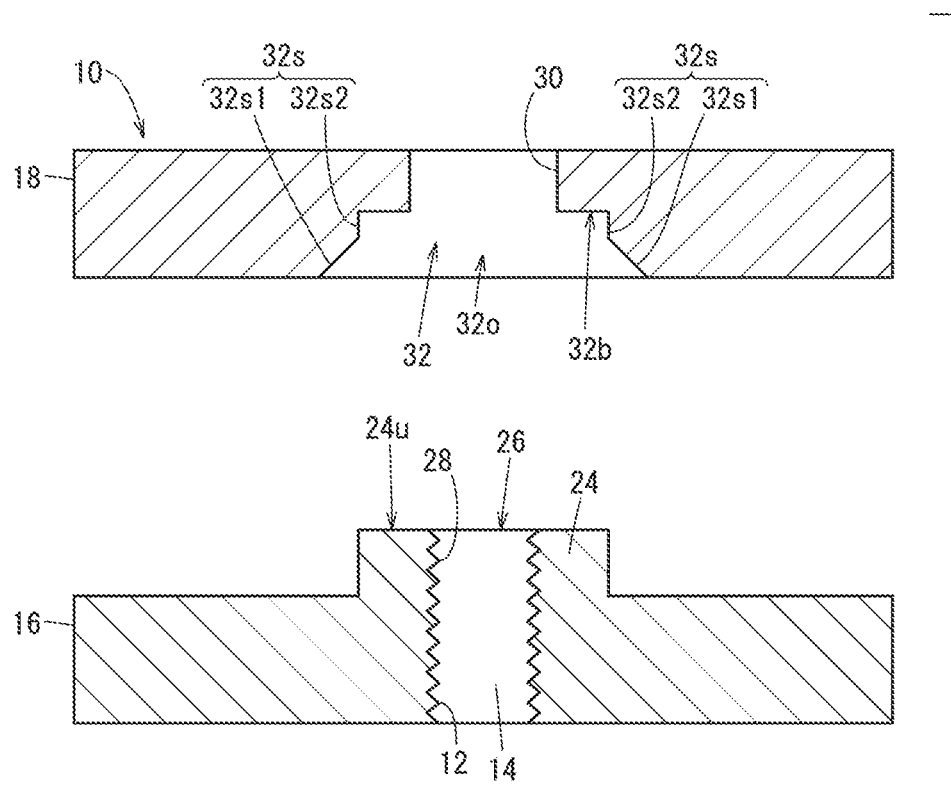
FIG. 7 is a cross-sectional view illustrating a coupling structure according to a first modification.

FIG. 7 is a cross-sectional view illustrating a coupling structure 10 according to a first modification. In the following, among the elements shown in FIG. 7, the description of the elements already described in the embodiment will be omitted as appropriate.

The concave portion 32 may have a tapered shape that narrows from an opening portion 32o of the concave portion 32 toward the bottom portion 32b of the concave portion 32. As shown in FIG. 7, this tapered shape is formed on side surfaces 32s of the concave portion 32. In this configuration, the convex portion 24 can be easily guided toward the bottom portion 32b by arranging the convex portion 24 along the side surfaces 32s having the tapered shape. Therefore, according to the present modification, the workability when the first member 16 and the second member 18 are coupled to each other is further improved.

It is preferable that the tapered shape of the concave portion 32 does not reach the bottom portion 32b as shown in FIG. 7. That is, it is preferable that the side surfaces 32s of the concave portion 32 each have a first side surface 32s1 having the above-described tapered shape, and a second side surface 32s2 that is closer to the bottom portion 32b (opposite to the opening portion 32o) than the first side surface 32s1 is and that restricts the relative movement of the convex portion 24 in the width direction. As a result, after the convex portion 24 is guided to the bottom portion 32b, the movement of the convex portion 24 in the width direction is restricted by the second side surfaces 32s2. Therefore, it is possible to easily maintain a state in which the possibility of positional displacement between the second through-hole 30 and the screw hole 14 is reduced.

Inventions that can be Obtained from the Embodiment

The inventions that can be grasped from the above-described embodiment and modification thereof will be described below.

A coupling structure (10) that fastens together a first member (16) provided with a screw hole (14) including a female thread (12), and a second member (18) stacked on the first member (16), by inserting, from a side of the second member (18), a screw member (22) including a male thread (20) configured to be screwed into the female thread (12), the coupling structure comprising a convex portion (24) provided in the first member (16) and including a first through-hole (26) configured to guide the screw member (22) to the screw hole (14), wherein the second member (18) includes a second through-hole (30) having a width ($L_{30}$) smaller than a width ($L_{24}$) of the convex portion (24) and configured to guide the screw member (22) to the screw hole (14) via the first through-hole (26), and a concave portion (32) configured to accommodate the convex portion (24).

As a result, the coupling structure (10) is provided that is capable of easily suppressing the relative positional displacement between the two members coupled by the screw member (22), and that has favorable workability.

The concave portion (32) may have a tapered shape that narrows from an opening portion (32o) of the concave portion (32) toward a bottom portion (32b) of the concave portion (32). This improves the workability when coupling the first member (16) and the second member (18) to each other.

An upper surface (24u) of the convex portion (24) may have a short side length (A) and a long side length (B) that are lengths from a center ($C_{26}$) of the first through-hole (26) to an outer edge of the upper surface (24u) viewed in a width direction, and the concave portion (32) in a state of accommodating the convex portion (24) may have a length (A') that is a length from the center ($C_{26}$) to an outer edge of the concave portion (32) viewed in the width direction and is less than the long side length (B). This prevents the first member (16) from rotating relative to the second member (18).

A screw groove (28) configured to be screwed with the male thread (20) when the screw member (22) is inserted may be formed in the first through-hole (26) so as to be continuous with the female thread (12). As a result, the female thread (12) of the screw hole (14) and the male thread (20) of the screw member (22) can be smoothly screwed together.

The invention claimed is:

1. A coupling structure that fastens together a first member provided with a screw hole including a female thread, and a second member stacked on the first member, by inserting, from a side of the second member, a screw member including a male thread configured to be screwed into the female thread, the coupling structure comprising a convex portion provided in the first member and including a first through-hole configured to guide the screw member to the screw hole, wherein the second member includes a second through-hole having a width smaller than a width of the convex portion and configured to guide the screw member to the screw hole via the first through-hole, and a concave portion configured to accommodate the convex portion, and the width of the first through-hole is larger than the width of the screw hole.

2. The coupling structure according to claim 1, wherein the concave portion has a tapered shape that narrows from an opening portion of the concave portion toward a bottom portion of the concave portion.

3. The coupling structure according to claim 1, wherein an upper surface of the convex portion has a short side length and a long side length that are lengths from a center of the first through-hole to an outer edge of the upper surface viewed in a width direction, and the concave portion in a state of accommodating the convex portion has a length that is a length from the center to an outer edge of the concave portion viewed in the width direction and is less than the long side length.

4. The coupling structure according to claim 1, wherein a screw groove configured to be screwed with the male thread when the screw member is inserted is formed in the first through-hole so as to be continuous with the female thread.

\* \* \* \* \*